(12) United States Patent
Chen

(10) Patent No.: US 9,404,596 B2
(45) Date of Patent: Aug. 2, 2016

(54) MULTIFUNCTIONAL CHECK VALVE DEVICE

(71) Applicant: Bao-Tang Chen, Lukang Township, Changhua County (TW)

(72) Inventor: Bao-Tang Chen, Lukang Township, Changhua County (TW)

( * ) Notice: Subject to any disclaimer, the term of this patent is extended or adjusted under 35 U.S.C. 154(b) by 0 days.

(21) Appl. No.: 14/587,036

(22) Filed: Dec. 31, 2014

(65) Prior Publication Data

US 2016/0186871 A1 Jun. 30, 2016

(51) Int. Cl.
*F16K 15/14* (2006.01)
*F16K 15/02* (2006.01)
*E03C 1/04* (2006.01)

(52) U.S. Cl.
CPC ............... *F16K 15/02* (2013.01); *E03C 1/0404* (2013.01); *E03C 2001/0415* (2013.01); *E03C 2201/40* (2013.01)

(58) Field of Classification Search
CPC .......... E03C 2001/0415; E03C 1/0404; F16K 15/185
USPC ............................................. 137/516.11, 854
See application file for complete search history.

(56) References Cited

U.S. PATENT DOCUMENTS 4,204,555 A * 5/1980 Durling ................... B60T 15/54
137/102

* cited by examiner

*Primary Examiner* — Kevin Lee
*Assistant Examiner* — P. Macade Nichols
(74) *Attorney, Agent, or Firm* — Alan D. Kamrath; Kamrath IP Lawfirm, P.A.

(57) ABSTRACT

A multifunctional check valve device contains: a base, an elastic member, and a locking member. The base includes a peripheral rib, an accommodating chamber, a column, a stopping face, a connecting orifice, a plurality of through orifices, a first outlet, and a positioning groove. The elastic member includes a fixing loop for retaining with the connecting orifice and a closing disc for corresponding to a second outlet of a pull-out faucet. An outer diameter of the closing disc is greater than an inner diameter of the closing disc, so the closing disc closes an inner face of an exit. The closing disc has a retaining tab for retaining with the positioning groove. The hollow locking member includes inner threads for screwing with outer threads of the pull-out faucet and accommodates the base. The hollow locking member also includes a third outlet for aligning with the first outlet of the base.

4 Claims, 8 Drawing Sheets

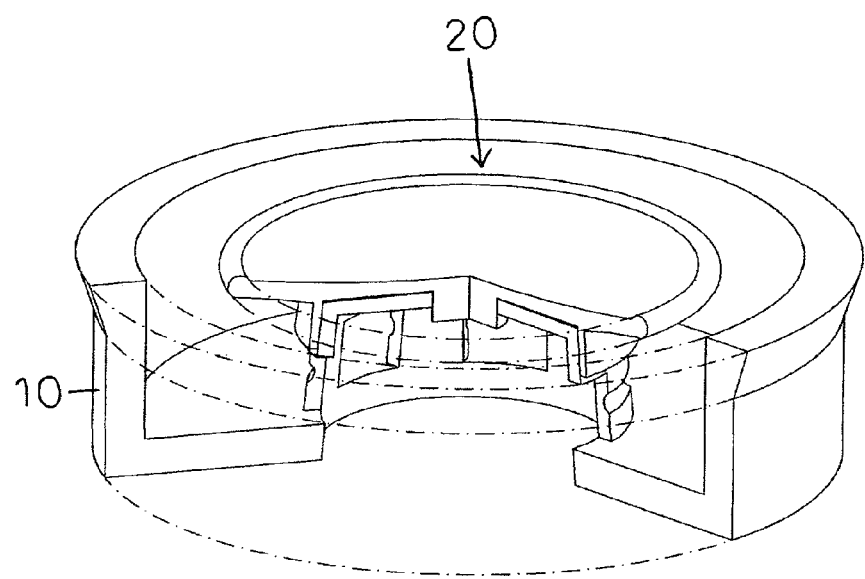
FIG·1

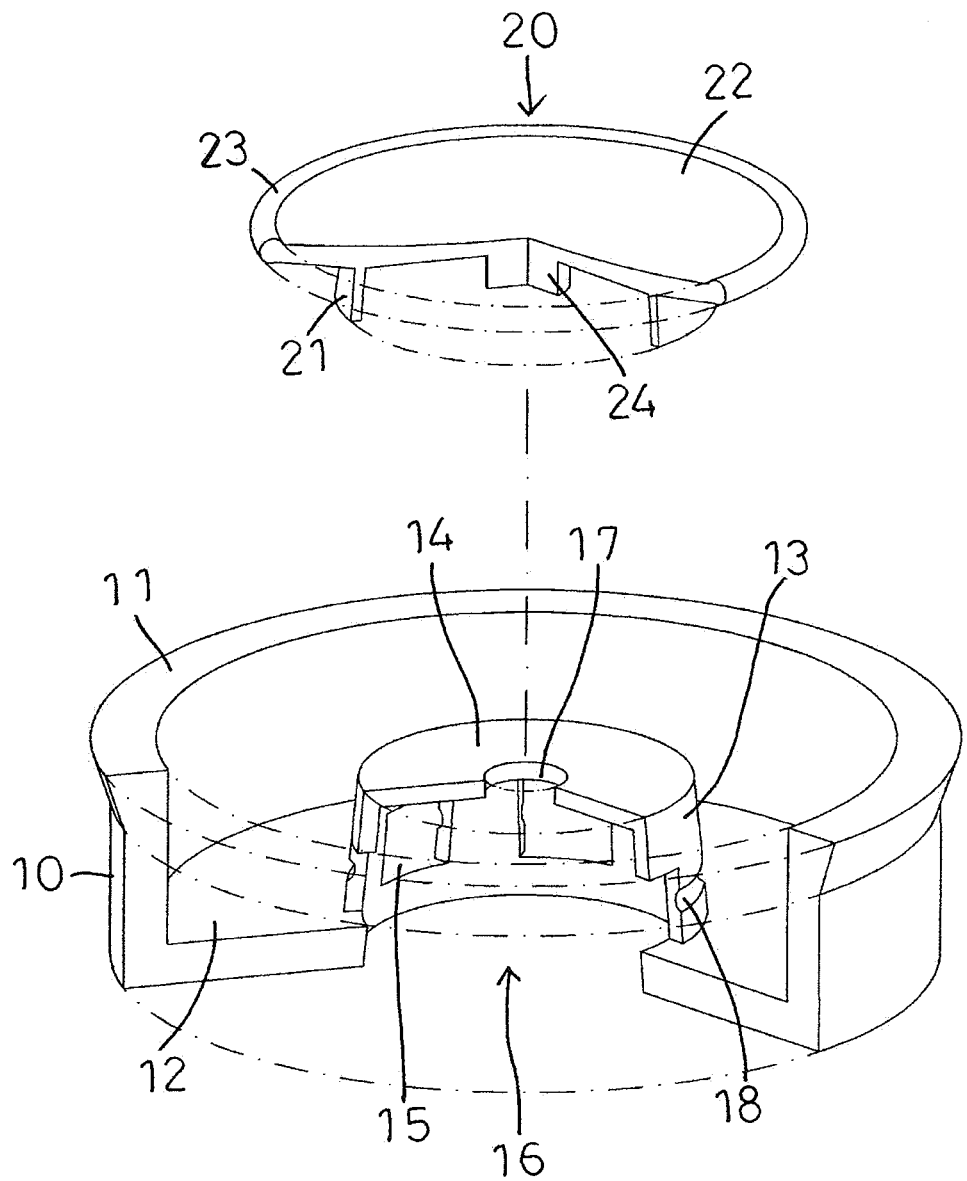
FIG·2

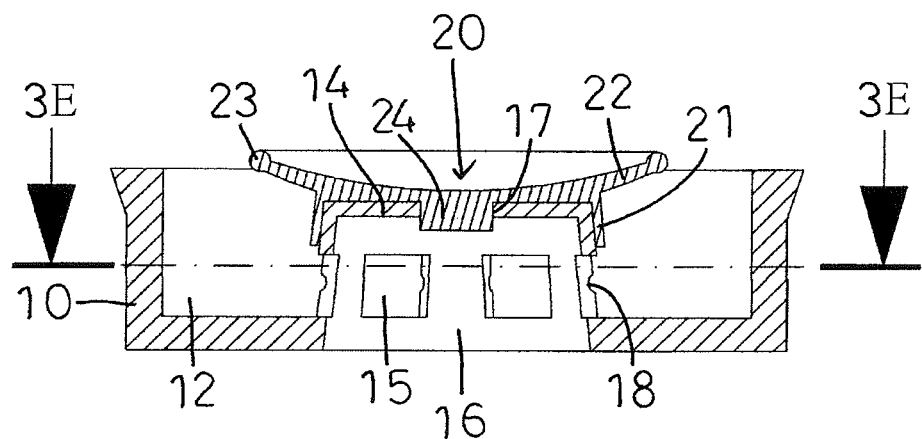
FIG·3
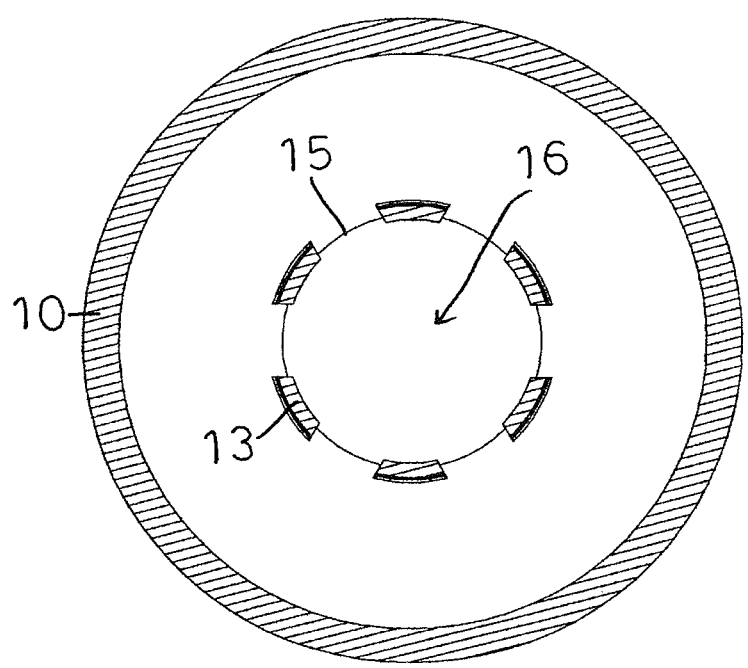
FIG·4

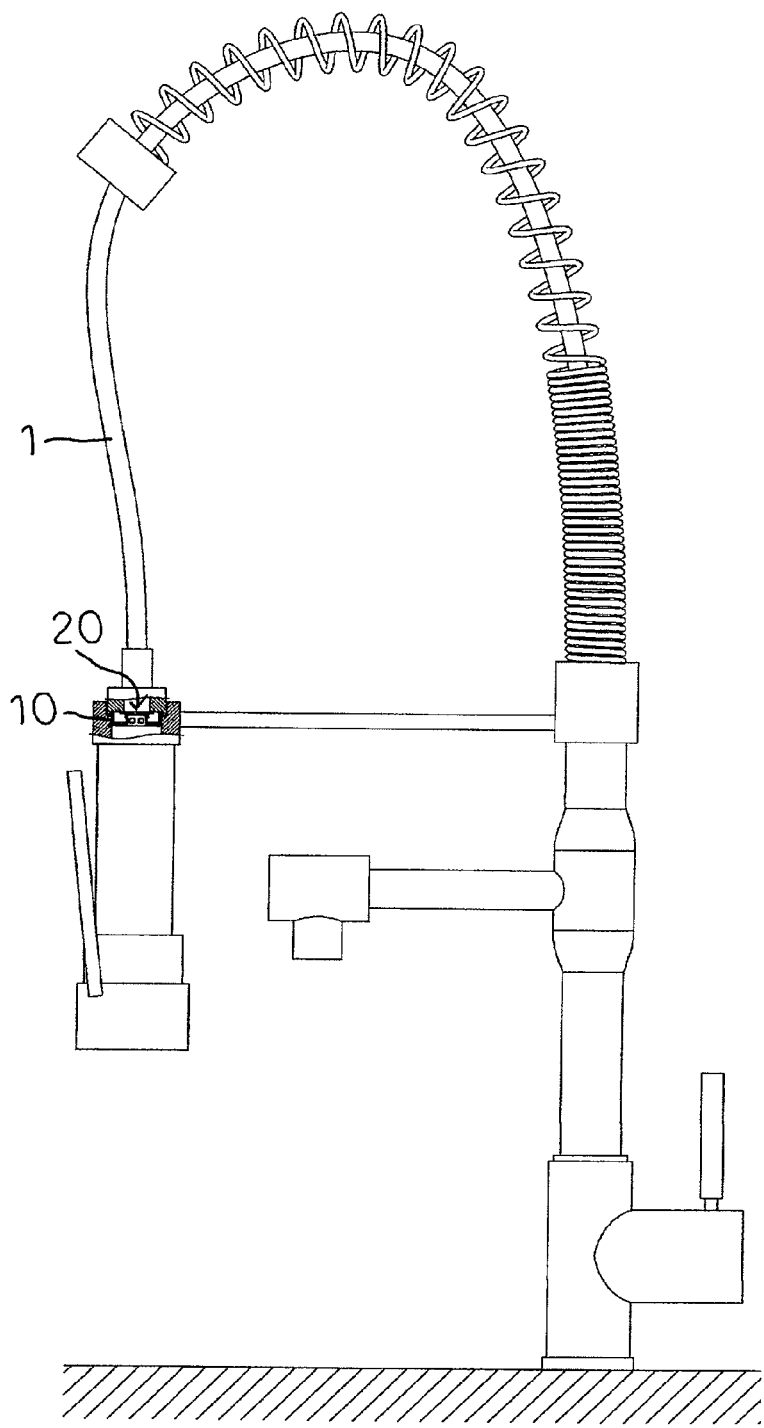
FIG·5

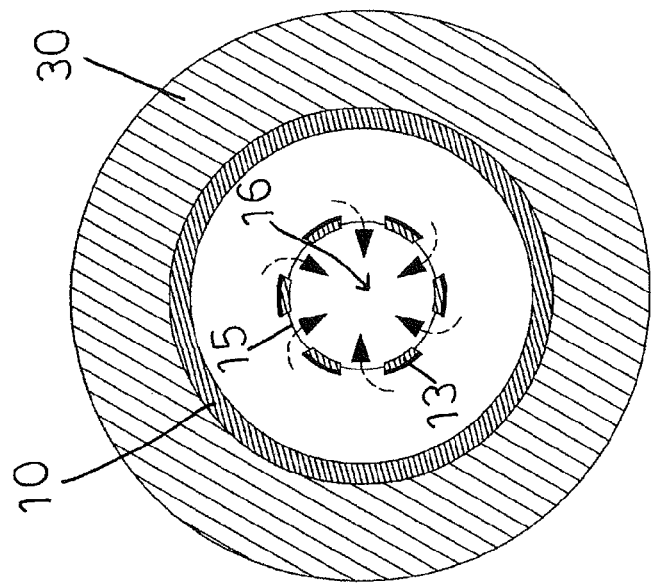
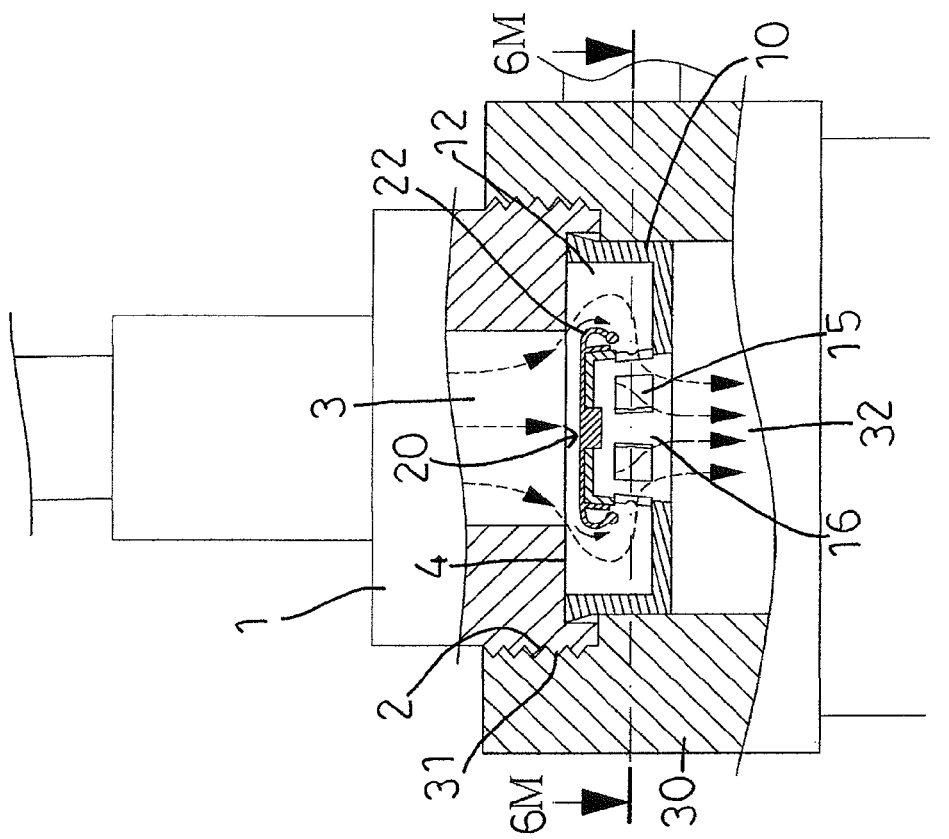

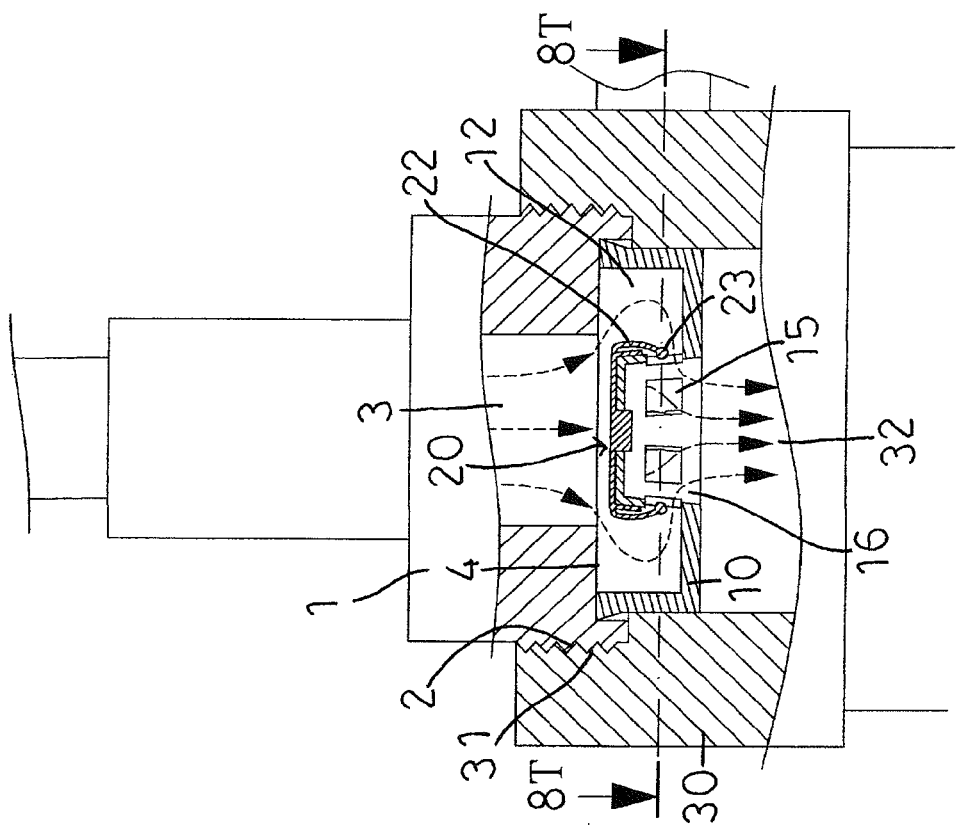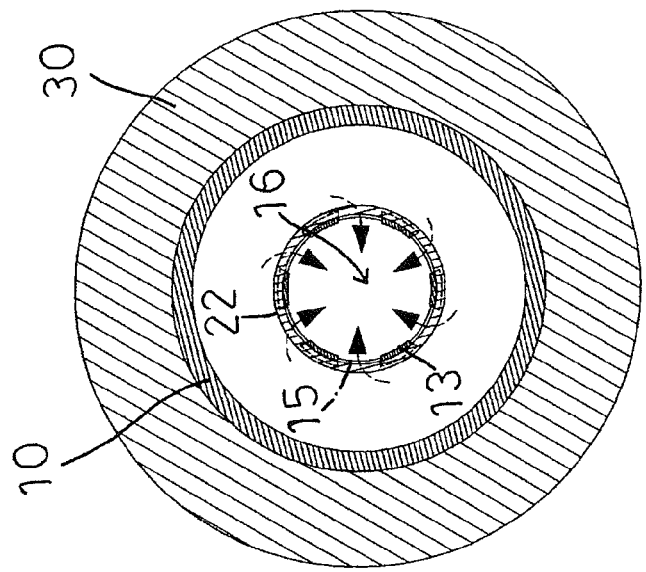

MULTIFUNCTIONAL CHECK VALVE DEVICE

FIELD OF THE INVENTION

The present invention relates to a multifunctional check valve device which is employed in a pull-out faucet to avoid dirty water in a kitchen sink flowing into the pull-out faucet.

BACKGROUND OF THE INVENTION

A conventional pull-out faucet is mounted on a kitchen sink to supply water, thus washing bowls, dishes, and fruits, etc. However, when dirty water is full of the kitchen sink and the pull-out faucet is pulled into the kitchen sink, the dirty water flows into the pull-out faucet.

Furthermore, the conventional pull-out faucet cannot save the water supply by using its outlet.

The present invention has arisen to mitigate and/or obviate the afore-described disadvantages.

SUMMARY OF THE INVENTION

The primary objective of the present invention is to provide a multifunctional check valve device which is employed in a pull-out faucet to avoid dirty water in a kitchen sink flowing into the pull-out faucet.

Another objective of the present invention is to provide a multifunctional check valve device which reduces half of water flow of a plurality of through orifices of a base to save a water supply.

To obtain above-mentioned objectives, a multifunctional check valve device provided by the present invention contains: a base, an elastic member, and a locking member.

The base includes a peripheral rib arranged around a top end thereof, an accommodating chamber defined therein, a column extending outwardly from a central position of the accommodating chamber, a stopping face formed on a top end of the column, a connecting orifice defined on a central position of the stopping face, a plurality of through orifices equidistantly defined around an outer wall of the column, a first outlet formed on a bottom end of the column, and a positioning groove formed on a lower side of the outer wall of the column.

The elastic member is made of deformable material and includes a fixing loop extending outwardly around a bottom end thereof to correspond to the column, wherein the fixing loop is fitted with the column of the base. The elastic member also includes a fitting segment extending downwardly from a central position of the bottom end thereof to correspond to the connecting orifice. The elastic member further includes a closing disc formed on a top end thereof and corresponding to an exit of a faucet, wherein an outer diameter of the closing disc is greater than an inner diameter of the closing disc, such that the closing disc of the elastic member closes an inner face of the exit; the closing disc has a retaining tab arranged around a peripheral side thereof and retaining with the positioning groove of the column of the base to reduce half of water flow from the plurality of through orifices.

The hollow locking member includes inner threads defined around an upper side of an inner wall thereof to screw with outer threads of the faucet, and the base is accommodated inside a lower side of the inner wall of the hollow locking member, the hollow locking member also includes a third outlet defined on a central position of a bottom end thereof and aligning with the first outlet of the base.

BRIEF DESCRIPTION OF THE DRAWINGS

FIG. 1 is a perspective view showing the assembly of a multifunctional check valve device according to a preferred embodiment of the present invention.

FIG. 2 is a perspective view showing the exploded components of the multifunctional check valve device according to the preferred embodiment of the present invention.

FIG. 3 is a cross sectional view showing the assembly of the multifunctional check valve device according to the preferred embodiment of the present invention.

FIG. 4 is a cross sectional view taken along the line 3E-3E of FIG. 4.

FIG. 5 is a side plan view showing an application of the multifunctional check valve device according to the preferred embodiment of the present invention.

FIG. 6 is a cross sectional view showing the operation of the multifunctional check valve device according to the preferred embodiment of the present invention.

FIG. 7 is a cross sectional view taken along the line 6M-6M of FIG. 6.

FIG. 8 is another cross sectional view showing the operation of the multifunctional check valve device according to the preferred embodiment of the present invention.

FIG. 9 is a cross sectional view taken along the line 8T-8T of FIG. 8.

DETAILED DESCRIPTION OF THE PREFERRED EMBODIMENTS

Figure 10:
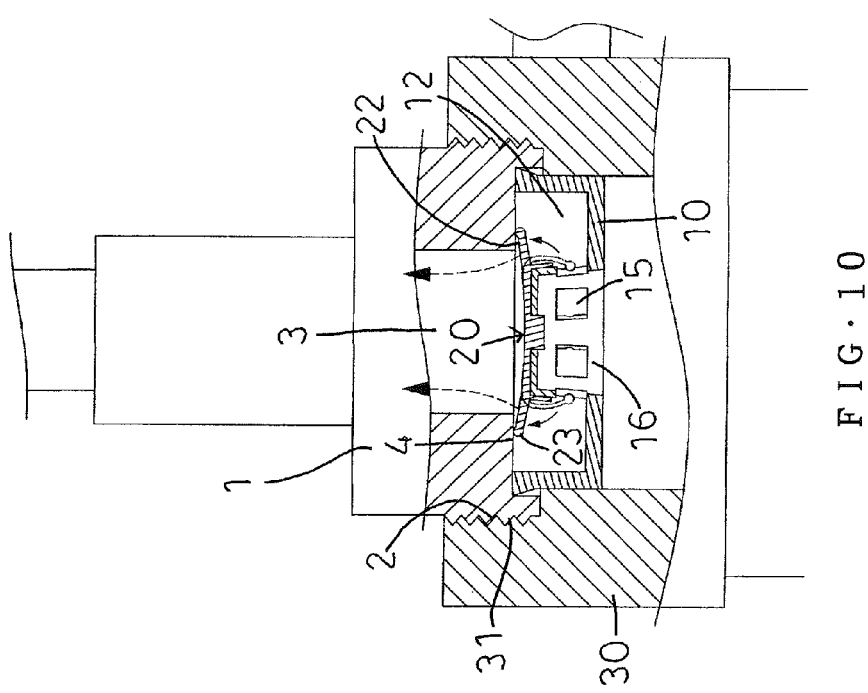
FIG. 10 is a cross sectional view showing the operation of an elastic member of the multifunctional check valve device according to the preferred embodiment of the present invention.

FIG. 1 is a perspective view showing the assembly of a multifunctional check valve device according to a preferred embodiment of the present invention. FIG. 2 is a perspective view showing the exploded components of the multifunctional check valve device according to the preferred embodiment of the present invention. FIG. 3 is a cross sectional view showing the assembly of the multifunctional check valve device according to the preferred embodiment of the present invention. FIG. 4 is a cross sectional view taken along the line 3E-3E of FIG. 3. FIG. 5 is a side plan view showing an application of the multifunctional check valve device according to the preferred embodiment of the present invention. The multifunctional check valve device of the present invention comprises: a base 10, an elastic member 20, and a locking member 30.

The base 10 includes a peripheral rib 11 arranged around a top end thereof, an accommodating chamber 12 defined therein, a column 13 extending outwardly from a central position of the accommodating chamber 12, a stopping face 14 formed on a top end of the column 13, a plurality of through orifices 15 equidistantly defined around an outer wall of the column 13, a first outlet 16 formed on a bottom end of the column 13, a connecting orifice 17 defined on a central position of the stopping face 14 to fit with the elastic member 20, and a positioning groove 18 formed on a lower side of the outer wall of the column 13.

The elastic member 20 is made of deformable silicone material and includes a fixing loop 21 extending outwardly around a bottom end thereof to correspond to the column 13, wherein the fixing loop 21 is fitted with the column 13 of the base 10; the elastic member 20 includes a fitting segment 24 extending downwardly from a central position of the bottom end thereof to correspond to the connecting orifice 17, such that the fitting segment 24 is fitted with the connecting orifice 17 of the stopping face 14 of the base 10, the elastic member 20 also includes a closing disc 22 formed on a top end thereof and corresponding to an exit 3 of a pull-out faucet 1, wherein an outer diameter of the closing disc 22 is greater than an inner diameter of the closing disc 22, such that when pressures outside and inside the pull-out faucet 1 are not equal, a pressure inside the pull-out faucet 1 sucks the closing disc 22 of the elastic member 20 and an inner face 4 of the exit 3 tightly, hence dirty water in a kitchen sink does not flow into the pull-out faucet 1. The closing disc 22 has a retaining tab 23 arranged around a peripheral side thereof and retaining with the positioning groove 18 of the column 13 of the base 10 to reduce half of water flow from the plurality of through orifices 15.

FIG. 6 is a cross sectional view showing the operation of the multifunctional check valve device according to the preferred embodiment of the present invention. FIG. 7 is a cross sectional view taken along the line 6M-6M of FIG. 6. Referring to FIGS. 6 and 7, in operation, the closing disc 22 of the elastic member 20 expands so that water flows into the plurality of through orifices 15 of the column 13 from the accommodating chamber 12 of the base 10, and then the water flows out of the first outlet 16 of the column 13 and a second outlet 32 of the locking member 30, thus supplying the water.

FIG. 8 is another cross sectional view showing the operation of the multifunctional check valve device according to the preferred embodiment of the present invention. FIG. 9 is a cross sectional view taken along the line 8T-8T of FIG. 8. As shown in FIGS. 8 and 9, when supplying the water at a large flow, the closing disc 22 of the elastic member 20 expands completely, and the retaining tab 23 is retained with the positioning groove 18 of the column 13 of the base 10, such that the closing disc 22 of the elastic member 20 shields half of plurality of through orifices 15, thus reducing the half of the water flow of the plurality of through orifices 15 to save a water supply.

FIG. 10 is a cross sectional view showing the operation of the elastic member of the multifunctional check valve device according to the preferred embodiment of the present invention. For example, when stopping the water supply and the pressures outside and inside the pull-out faucet 1 are not equal, the pressures sucks the closing disc 22 of the elastic member 20 and the inner face 4 of the exit 3 tightly, hence the dirty water in the kitchen sink does not flow into the pull-out faucet 1.

Figure 11:
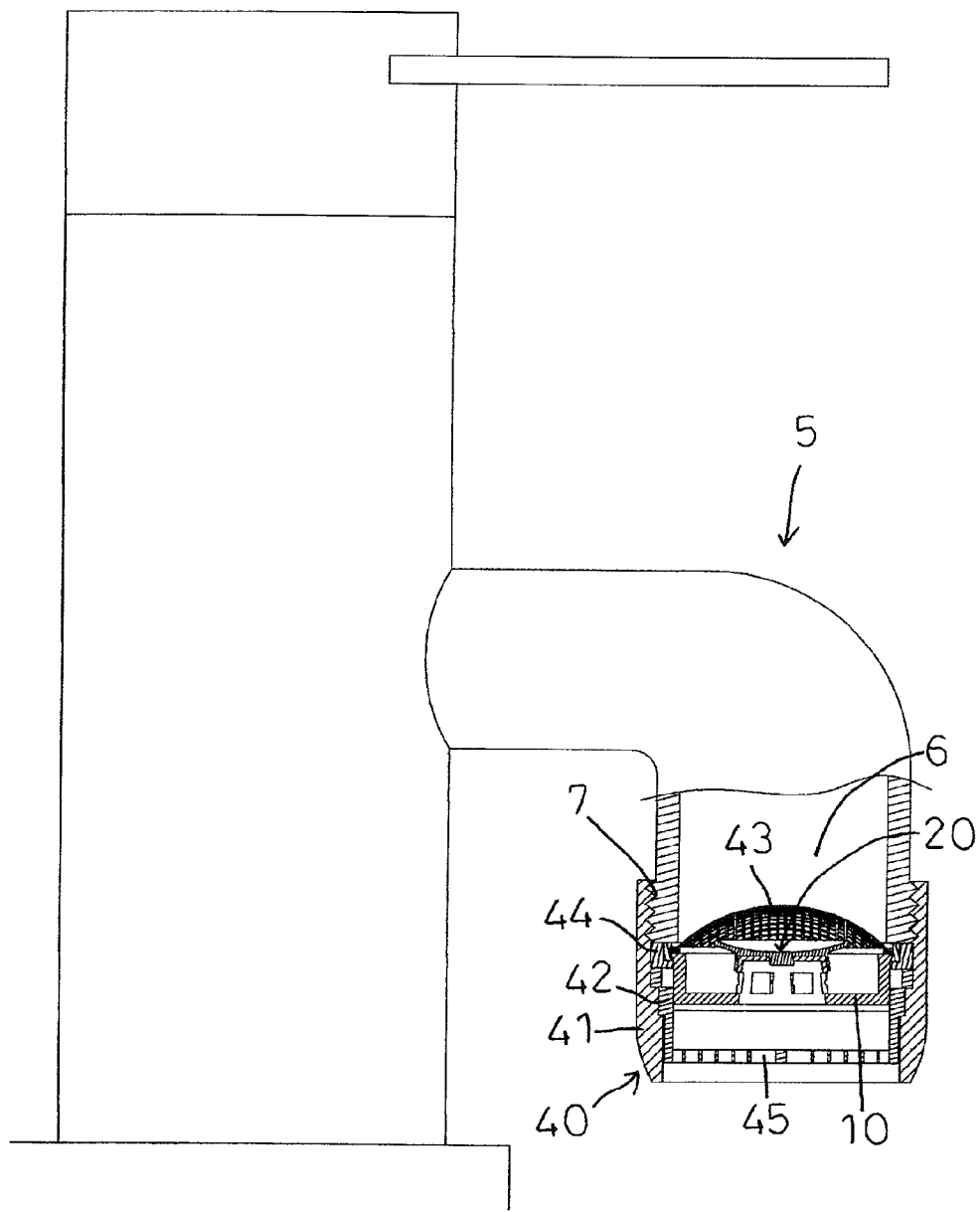
FIG. 11 is a cross sectional view showing another application of the multifunctional check valve device according to the preferred embodiment of the present invention.

FIG. 11 is a cross sectional view showing another application of the multifunctional check valve device according to the preferred embodiment of the present invention. In another application, a pull-out faucet 5 includes outer threads 7 defined around an exit 6 thereof to screw with a faucet aerator 40. The faucet aerator 40 is comprised of an external connector 41, an internal connector 42, a filter 43, and an engaging ring 44. The external connector 41 has the internal connector 42 mounted therein, the internal connector 42 has a plurality of openings 45 formed on a bottom end thereof to flow the water and has the filter 43 fixed on a top end thereof, and the filter 43 has the engaging ring 44 arranged around an outer wall thereof, wherein between the filter 43 and the internal connector 42 is defined the multifunctional check valve device, and the faucet aerator 40 is applied to reduce water pressure.

While we have shown and described various embodiments in accordance with the present invention, it is clear to those skilled in the art that further embodiments may be made without departing from the scope of the present invention.

What is claimed is:

1. A multifunctional check valve device being mounted on an exit of a faucet and comprising: a base, an elastic member, and a locking member; wherein
    the base includes a peripheral rib arranged around a top end thereof, an accommodating chamber defined therein, a column extending outwardly from a central position of the accommodating chamber, a stopping face formed on a top end of the column, a connecting orifice defined on a central position of the stopping face, a plurality of through orifices equidistantly defined around an outer wall of the column, a first outlet formed on a bottom end of the column, and a positioning groove formed on a lower side of the outer wall of the column;
    the elastic member is made of deformable material and includes a fixing loop extending outwardly around a bottom end thereof to correspond to the column, wherein the fixing loop is fitted with the column of the base; the elastic member also includes a fitting segment extending downwardly from a central position of a bottom end thereof to correspond to the connecting orifice; the elastic member further includes a closing disc formed on a top end thereof and corresponding to an exit of a faucet, wherein an outer diameter of the closing disc is greater than an inner diameter of the closing disc, such that the closing disc of the elastic member closes an inner face of the exit; the closing disc has a retaining tab arranged around a peripheral side thereof and retaining with the positioning groove of the column of the base to reduce half of water flow from the plurality of through orifices;
    a hollow locking member includes inner threads defined around an upper side of an inner wall thereof to screw with outer threads of the faucet, and the base is accommodated inside a lower side of the inner wall of the hollow locking member, the hollow locking member also includes a third outlet defined on a central position of a bottom end thereof and aligning with the first outlet of the base.

2. The multifunctional check valve device as claimed in claim 1, wherein the elastic member is made of silicone material.

3. The multifunctional check valve device as claimed in claim 1, wherein the faucet is a pull-out faucet.

4. The multifunctional check valve device as claimed in claim 1, wherein the faucet includes outer threads defined around the exit thereof to screw with a faucet aerator; the faucet aerator is comprised of an external connector, an internal connector, a filter, and an engaging ring; the external connector has the internal connector mounted therein, the internal connector has a plurality of openings formed on a bottom end thereof to flow the water and has the filter fixed on a top end thereof, and the filter has the engaging ring arranged around an outer wall thereof, wherein between the filter and the internal connector is defined the multifunctional check valve device.

* * * * *